Patented Feb. 13, 1934

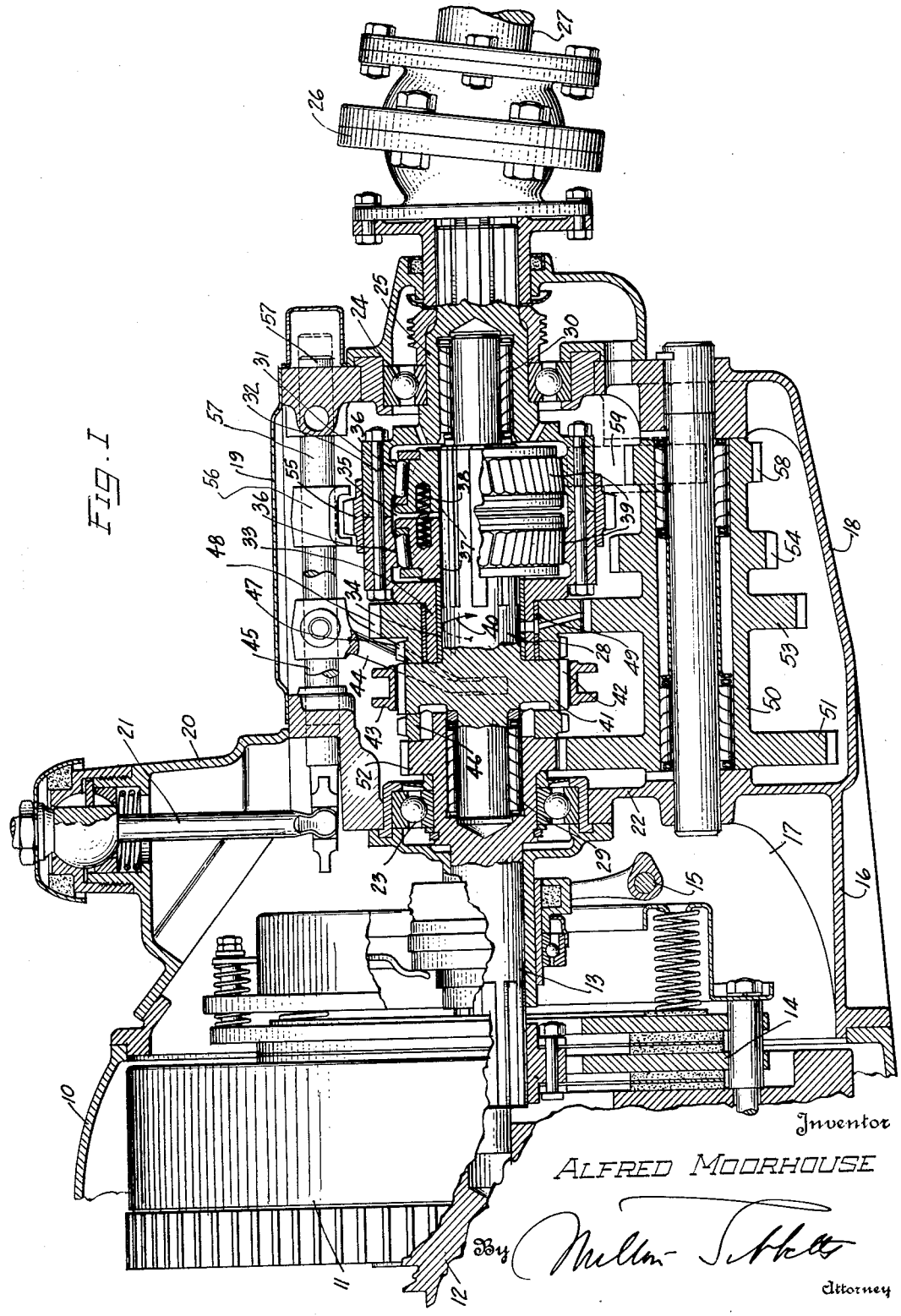

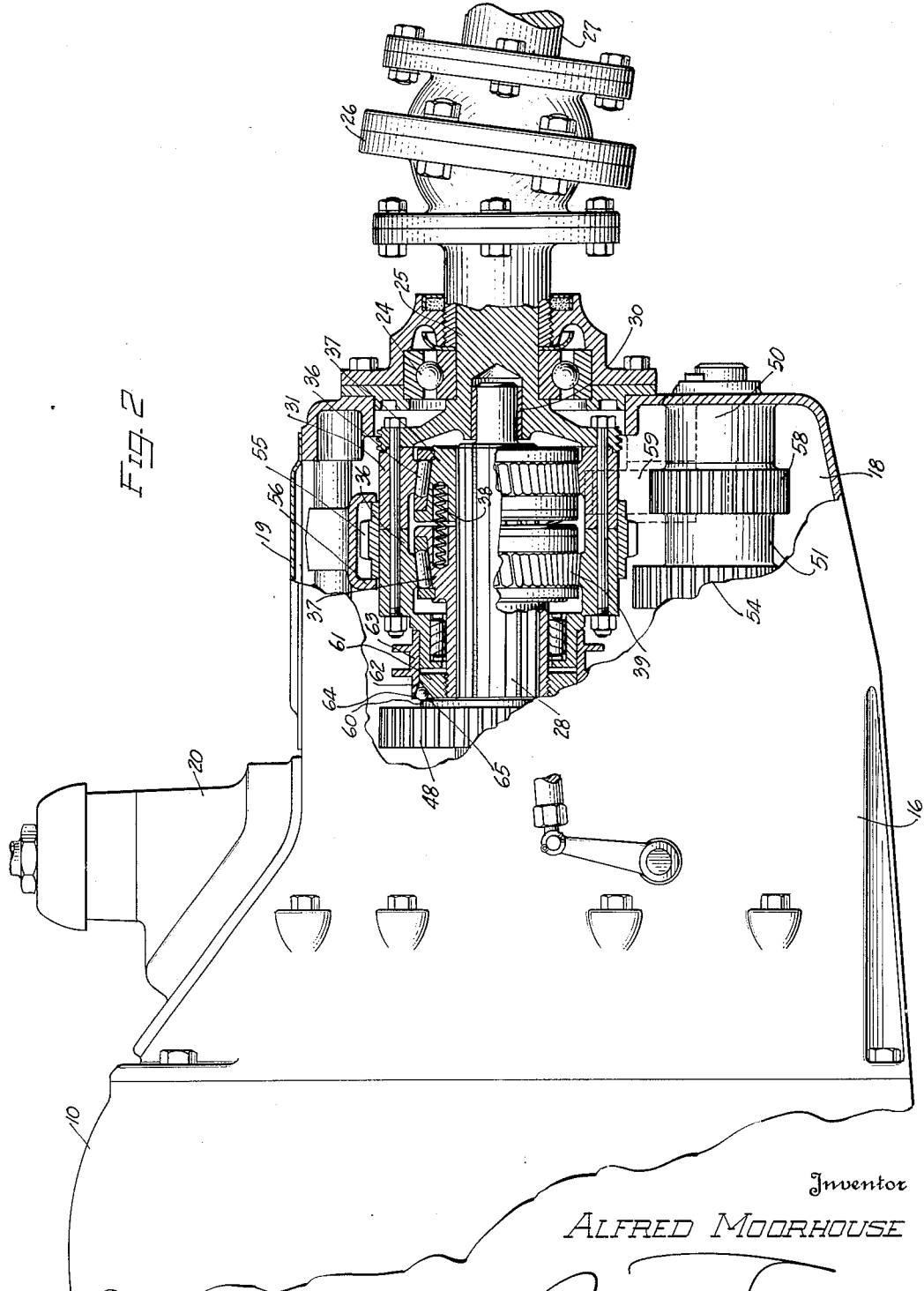

1,946,871

UNITED STATES PATENT OFFICE 1,946,871

MOTOR VEHICLE TRANSMISSION

Alfred Moorhouse, Detroit, Mich., assignor to Packard Motor Car Company, Detroit, Mich., a corporation of Michigan Application May 14, 1929. Serial No. 362,984

22 Claims. (Cl. 74—57)

This invention relates to motor vehicles and particularly to transmission mechanism such as is used on motor vehicles.

The conventional form of transmission mechanism or gearing used on motor vehicles today is what is termed a three forward speed and reverse gearing. The various speeds and reverse are obtained by shifting the gears at the time the engine is disconnected from the gearing as by throwing out the clutch which is arranged between the engine and the gearing. In this construction, when any one of the speeds of the transmission is operative, the vehicle may be driven by the engine, or if the engine throttle is closed the momentum of the vehicle may drive the engine through the transmission. Thus the engine may act as a brake. Particularly is this braking action noticeable when the transmission is in first or second speed gear. Under these circumstances it is evident that the vehicle may be allowed to coast without the braking effect of the engine, only by throwing out the clutch or moving the gears of the transmission into neutral position, and since this requires an act of the operator, the result is that most driving is done in gear.

It has been proposed that a one-way clutch device may be arranged between the transmission mechanism and the driving wheels of the vehicle, preferably immediately at the rear end of the gearing, and thus when the engine throttle is closed the vehicle may over-run the engine, as it were, so that there is no braking effect of the engine on the vehicle. This is called "free-wheeling". In some cases the "free-wheeling" device or one-way clutch has been made so that it can be rendered inoperative by the movement of a lever so that the braking effect of the engine may be used through the transmission mechanism in the usual way.

It is one of the objects of the present invention to provide a transmission mechanism in which a one-way clutch device is embodied in the mechanism itself.

Another object of the invention is to provide a transmission mechanism which will permit "free-wheeling" in one of the forward speed gears but not in another, so that at least one of the speed gears may be used to bring in the braking effect of the engine.

Another object of the invention is to provide a transmission mechanism with a one-way clutch device of small compass so that it may be arranged within one of the speed gears.

Another object of the invention is to provide a transmission mechanism with a direct and forward geared speed drive through a one-way clutch and with a forward speed drive independently of the one-way clutch so that in the latter speed drive the engine may be used as a brake.

Another object of the invention is to provide a transmission mechanism with the conventional multiple forward speed and reverse gearing which drives both ways but which may be adjusted so that "free-wheeling" will be effective in part of the forward drives.

Other objects of the invention will appear from the following description taken in connection with the drawings, which form a part of this specification, and in which:

Fig. 1 is a longitudinal sectional view through the transmission mechanism of a motor vehicle embodying the invention, and Fig. 2 is a view similar to Fig. 1 illustrating a modified form of part of the mechanism. In Fig. 2 only part of the mechanism is shown in section, the remainder being in elevation.

Referring to the construction shown in Fig. 1, the rear end of a motor vehicle engine is shown at 10 and the engine fly wheel is indicated at 11, this being mounted on the rear end of the crank shaft 12. An aligned shaft 13, which we will call the driving shaft, is driven by the crank shaft 12 of the engine through a clutch 14 of the usual or conventional form. The clutch is operated by the usual throw-out shaft 15 by a pedal lever or other device.

A casing 16 is secured to the rear end of the casing of the engine and this is preferably formed with two compartments, a compartment 17 surrounding the clutch and a compartment 18 which forms the gear box or transmission unit. A cover 19 is shown as forming the upper portion of the casing 18 and a cover 20 is arranged over an opening in the clutch compartment 17 and forms a support for a gear shifter lever 21 which shifts the sliding gears hereinafter referred to.

A wall 22 separates the compartments 17 and 18 and in this wall a ball bearing 23 supports the rear end of the driving shaft 13.

Mounted in a bearing 24 at the rear end of the casing is a driven shaft 25 preferably axially aligned with the driving shaft 13. A universal joint 26 connects this shaft with the propeller shaft 27 which in turn connects with the rear axle and driving wheels of the vehicle.

An intermediate shaft 28 has a bearing 29 in the driving shaft 13 and a bearing 30 in the driven shaft 25. Thus the shaft 28 is axially aligned with shafts 13 and 25.

The driven shaft 25 is enlarged at 31 and telescopes with the shaft 28. In fact, the enlarged part of the shaft 25 is formed in two pieces secured together by bolts 32 and its extreme forward end is again contracted as at 33 and has a bearing on a cylindrical part of the intermediate shaft 28 as at 34. This enlarged part 31 of the driven shaft 25 provides a housing for a one-way clutch device indicated generally at 35. This device may comprise any one of the various one-way clutches of the prior art such as shown in the patent to Humfrey No. 1,670,197, dated May 15, 1928. But since the space in which this clutch device must be positioned is necessarily of small diameter, a novel form of device has been provided. Thus the two parts of the enlarged casing 31 are formed with opposite conical surfaces 36 and there are opposed sliding cones 37 keyed or splined so that they may slide upon and turn with the shaft 28. Several springs 38 tend to separate the cones 37, and rollers 39 are arranged between the cones 37 and the conical surfaces 36 and these rollers are so inclined that a duplex one-way clutch is formed between the intermediate shaft 28 and the driven shaft 25. Thus the shaft 28 will always drive the driven shaft 25 in clockwise direction as indicated by the arrow 40 on shaft 28, but the driven shaft 25, turning in the same direction, cannot drive the shaft 28 but will over-run it. Thus there will always be "free-wheeling" between the shafts 28 and 25.

Intermediate shaft 28 is enlarged at 41 and provided with peripheral teeth 42, and slidably arranged on these teeth 42 and meshing with them, is a ring 43 which may be moved from one position to another by an arm 44 mounted on a shifter rod 45 in the upper part of the casing. A toothed clutch element 46 is secured to the end of the driving shaft 13, and a similar toothed clutch element 47 is connected to a gear 48 which is loosely or rotatably mounted on the contracted portion 33 of the driven shaft 25, so that it surrounds the intermediate shaft 28. This bearing is shown at 49. The ring 43 may be moved by the shifter rod 45 into clutching engagement with clutch element 46 or clutch element 47 so that the intermediate shaft 28 may be connected either to the driving shaft 13 for direct drive or to the gear 48 for a geared drive.

Mounted in the gear compartment 18 of the transmission casing is a lay shaft 50 upon which is a gear 51 in constant mesh with a gear 52 on the driving shaft 13. Thus the lay shaft 50 is always driven by the driving shaft 13 at a reduced speed.

Lay shaft 50 also has a gear 53 in constant mesh with gear 48 and thus when intermediate shaft 28 is clutched to gear 48 there is an indirect geared drive at reduced speed from driving shaft 13 through gears 52 and 51 to lay shaft 50 and through gears 53 and 48 to intermediate shaft 28.

Since both the direct drive and the above described geared drive are to the shaft 28, these drives must pass to the driven shaft 25 through the one-way clutch device and consequently there is always "free-wheeling" on both of these drives.

On lay shaft 50 there is also a gear 54, which is smaller than the gear 53, and on the enlarged part 31 of the driven shaft 25, and surrounding the one-way clutch device 35, is a gear 55. This gear 55 is keyed or splined upon the driven shaft and it may be shifted from one position to another by a yoke 56 on shifter rod 57 arranged parallel to the rod 45 above described. Either one or the other of these rods 45—56 may be moved from a neutral position to positions forward and back of said neutral position by the shifter lever 21 in the usual way.

Also on the lay shaft 50 is a gear 58, smaller than the gear 54, which gear 58 constantly meshes with a reverse gear 59 suitably mounted in the casing 18. The gear 55 may be moved into mesh either with the first speed gear 54 or the reverse gear 59 so that the drive from the shaft 13 to the shaft 25 may be effected through either of these gears. By thus arranging the gear 55 on the outside of the enlarged portion 31 of the driven shaft 25, the one-way clutch device 35 may be arranged within and surrounded by the sliding gear 55 and thus conserve space lengthwise of the gear box.

Since the first speed gear through the gear 54 is direct to the driven shaft 25 through the gear 55, this particular speed gear drives around the one-way clutch device and consequently the "free-wheeling" is eliminated and the vehicle may be driven by the engine as well as the engine by the vehicle, in the first speed gearing and the reverse gearing. Thus the engine may be used as a brake while in first or reverse gear.

Referring to the construction shown in Fig. 2, certain parts have similar numerals to those shown in Fig. 1. Thus the following are the same: engine 10, casing 16, compartment 18, covers 19 and 20 respectively, bearing 24, driven shaft 25, universal joint 26, propeller shaft 27, intermediate shaft 28, bearing 30, enlarged part 31, lay shaft 50, gear 54, gear 58, reverse gear 59, gear 55 and shifter arm 56.

The conical surfaces 36 and the cones 37, springs 38 and rollers 39 are also similar, except that the rollers at the left are skewed in the opposite direction from those shown in Fig. 1 with the result that this left hand part of the clutch device will act to drive the engine from the vehicle just as the right part of the clutch will act to drive the vehicle from the engine. Thus in the normal position of these parts, with the springs 38 acting to separate the cones 37, the right hand clutch will drive from engine to wheels and would "free-wheel" in the opposite direction if alone, and the left hand clutch will drive from vehicle wheels to engine and would, if alone, "free-wheel" in the opposite direction. Thus there is a drive in both directions and these oppositely acting clutches simply form a positive clutch between the intermediate and driven shafts.

In order that "free-wheeling" may take place the left hand clutch is adapted to be released by the operator and to do this it is only necessary to shift the left hand cone 37 to the right in opposition to the springs 38. This is done by providing a collar 60 on the intermediate shaft 28, an opposing collar 61 on the cone 37, which latter collar has an inclined annular surface 62, and a sleeve 63 with an interior conical surface as at 64, and balls 65 arranged between the collar 60 and the surfaces 62 and 64. Thus, when the sleeve 63 is moved towards the left in Fig. 2 the balls 65 are moved radially inwardly and this moves the collar 61 and consequently the cone 37 towards the right. This movement of the cone 37 entirely releases the left hand clutch device and only the right hand clutch device is then operative. Since the right hand clutch device drives from shaft 28 to shaft 25 and "free-wheels" in the opposite direction, the transmission mechanism is now a "free-wheel" mechanism in second speed and direct drive gears.

A suitable lever mechanism may be provided for shifting the sleeve 63 so that the operator may position the cone 37 either for making the whole clutch device a two-way clutch or for making the left hand clutch device inoperative as above described.

It will be understood that various forms of the invention other than those described above may be used without departing from the spirit or scope of the invention.

Having thus described my invention, what I claim and desire to secure by Letters Patent is:

1. In transmission mechanism, the combination of driving, driven and intermediate shafts and a lay shaft, a direct drive coupling between the driving and intermediate shafts, constant mesh gears between the driving and lay shafts, a constant mesh gear connection between the lay and intermediate shafts, a single shiftable gear splined on the driven shaft for connecting the lay and driven shafts for either forward or reverse driving, and a one-way clutch device driving from the intermediate to the driven shaft.

2. In transmission mechanism, the combination of driving, driven and intermediate shafts and a lay shaft, a direct drive coupling between the driving and intermediate shafts, constant mesh gears between the driving and lay shafts, a constant mesh gear connection between the lay and intermediate shafts, a gear connection between the lay and driven shafts including a shiftable gear on the driven shaft, and a one-way clutch device within the shiftable gear arranged to drive the driven shaft from the intermediate shaft.

3. In a transmission mechanism, the combination of a driving shaft, a driven shaft, an intermediate shaft, a lay shaft, means for connecting the driving shaft to and disconnecting it from the intermediate shaft, forward-speed gearing connecting the driving shaft and the lay shaft, a single shiftable gear for forwardly or reversely connecting the lay shaft with the driven shaft, and a one-way clutch device operating between the intermediate shaft and the driven shaft and arranged within the shiftable gear for connecting the lay shaft and the driven shaft.

4. In transmission mechanism, the combination of a driving shaft, a driven shaft, an intermediate shaft, said driven shaft having a part over-hanging one end of the intermediate shaft, and supported thereby a one-way clutch device between the intermediate shaft and the over-hanging part of the driven shaft, means for connecting and disconnecting the driving and intermediate shafts, and reduction gearing between the driving shaft and the driven shaft, one gear of which reduction gearing is slidably splined on the overhanging part of said driven shaft.

5. In transmission mechanism, the combination of a driving shaft, a driven shaft, an intermediate shaft, said driven shaft having a part over-hanging one end of the intermediate shaft, a one-way clutch device between the intermediate shaft and the over-hanging part of the driven shaft, means for connecting and disconnecting the driving and intermediate shafts, and reduction gearing between the driving shaft and the driven shaft, one gear of which reduction gearing is slidably arranged upon and keyed to the overhanging part of said driven shaft.

6. In transmission mechanism, the combination of a driving shaft, a driven shaft, an intermediate shaft, a one-way clutch device arranged between the intermediate shaft and the driven shaft, means for connecting the driving shaft to the intermediate shaft either for direct drive or for a geared forward drive, and means for driving the driven shaft forwardly or reversely from the driving shaft through gearing which includes a shiftable gear encircling and independently of the intermediate shaft.

7. In a transmission mechanism, the combination of a driving shaft and a driven shaft, means including a one-way clutch device for driving the driven shaft forwardly from the driving shaft either directly or through a geared connection, and means associated with a part of said geared connection for driving the driven shaft forwardly or reversely from the driving shaft around said one-way clutch device, said means including a single shiftable driving gear for establishing a driving connection in either direction.

8. In transmission mechanism, the combination of a casing, a driving shaft, a driven shaft, and an intermediate shaft, said three shafts being mounted in said casing in axial alignment, a lay shaft also mounted in said casing and having constant mesh gearing with said driving shaft, a gear surrounding said intermediate shaft, and loosely mounted on said driven shaft a gear on said lay shaft in constant mesh with said loosely mounted gear, positive clutch means for connecting either the driving shaft or said loosely mounted gear to the intermediate shaft, and a one-way clutch device arranged between the intermediate shaft and the driven shaft.

9. In transmission mechanism, the combination of a casing, a driving shaft, a driven shaft, and an intermediate shaft, said three shafts being mounted in said casing in axial alignment, a lay shaft also mounted in said casing and having constant mesh gearing with said driving shaft, a loosely mounted gear surrounding said intermediate shaft, a gear on said lay shaft in constant mesh with said loosely mounted gear, positive clutch means for connecting either the driving shaft or said loosely mounted gear to the intermediate shaft, a one-way clutch device arranged between the intermediate shaft and the driven shaft, and forward and reverse gearing arranged between said lay shaft and said driven shaft, one of the gears of the latter gearing being a slidable gear on the driven shaft and surrounding said one-way clutch device.

10. In transmission mechanism, the combination of driving and driven shafts, multiple forward speed and reverse gearing between said shafts, oppositely acting one-way clutches forming the connection between one of said forward speed gears and the driven shaft, means for rendering one of said clutches inoperative, and a single shiftable driving gear for forming, independently of the clutches, the reverse geared or another forward geared connection between the shafts.

11. In transmission mechanism, the combination of driving and driven shafts, an intermediate shaft, a lay shaft, geared and direct forward drive mechanism between the drive and intermediate shafts, a single shiftable forward or reverse driving gear forming the connection between the lay shaft and the driven shaft, oppositely acting one-way clutch devices between the intermediate shaft and the driven shaft, and means for disengaging one of said clutches.

12. In transmission mechanism, the combination of a driving shaft, a driven shaft, an intermediate shaft, a direct drive coupling between the driving and intermediate shafts, reduction gearing between the driving and intermediate shafts, forward and reverse reduction gearing independent of said intermediate shaft between the driving and driven shafts, and a clutch device between the intermediate and driven shafts.

13. In transmission mechanism, the combination of driving, driven and intermediate shafts and a lay shaft, a direct drive coupling between the driving and intermediate shafts, constant mesh gears between the driving and lay shafts, a shiftable clutch connection between the lay and intermediate shafts, a shiftable gear mounted on the driven shaft forming a two-way connection between the lay and driven shafts, and a clutch device between the intermediate and driven shafts, said clutch device being encircled by said shiftable gear.

14. In a transmission mechanism, the combination of a driving shaft, a driven shaft, an intermediate shaft, a lay shaft, means for connecting the driving shaft to and disconnecting it from the intermediate shaft, gearing connecting the driving shaft and the lay shaft, a single shiftable gear on said driven shaft for connecting the lay shaft with the driven shaft for either forward or reverse rotation, and a clutch device operating between the intermediate shaft and the driven shaft and arranged within one of the gears of the gearing between the lay shaft and the driven shaft.

15. In a transmission mechanism, the combination of a drive shaft, a driven shaft, an intermediate shaft supported at one point by the driven shaft and in turn supporting it at another point, means for driving said intermediate shaft from said drive shaft at two speeds relative to the latter, means actuated by said intermediate shaft operating to drive said driven shaft in one direction and permit overrun of said driven shaft in the same direction under the momentum of the latter, and means comprising a gear mounted on the driven shaft between said two points of support for selectively driving said driven shaft from said drive shaft at a third speed relative to the drive shaft or in a reverse direction.

16. In a transmission mechanism, a driven shaft, a drive shaft having a gear fixed thereto, a lay shaft, a drive gear on the lay shaft in constant mesh with the gear on the drive shaft, a plurality of reduction gears on the lay shaft constantly driven by the meshing gears, a loose gear in constant mesh with one of the reduction gears, driving mechanism associated with the driven shaft including a one-way clutch, clutch means for selectively establishing a driving connection from either the driving shaft or the loose gear to the driving mechanism, and means for selectively establishing a two-way driving relationship from any one of the other reduction gears associated with the lay shaft to a portion of the driving mechanism avoiding the one-way clutch.

17. In transmission mechanism, the combination of a drive shaft, a driven shaft, a direct and a geared drive means between said shafts including a one-way driving device, a shiftable gear clutch for establishing driving relation between either said direct or geared drive means and said shafts, means adapted to establish a low speed drive connection between the shafts, means adapted to establish a reverse drive between the shafts, said low speed and reverse drive means avoiding said one-way driving device and including a shiftable gear element, and mechanism, including a single control lever, for selectively moving said shiftable gear clutch and said gear element to establish the desired driving relation thereof.

18. In transmission mechanism comprising coaxial driving and driven shafts, a lay shaft parallel thereto, constantly meshed gears on the driving shaft and the lay shaft, gearing between the lay and driven shafts driven by said constantly meshed gears, a single gear element slidably mounted on said driven shaft for connecting some of said gearing thereto for either forward or reverse two-way operation thereof by the driving shaft, a one-way driving device between the driving and the driven shafts forming an additional means for transmitting the drive to the driven shaft, and a shiftable gear clutch for forming either a direct or geared forward drive between said driving shaft and said one-way driving device.

19. In transmission mechanism, the combination of a drive shaft, a driven shaft, a direct and a geared forward drive means between said shafts including a one-way driving device, a single shiftable gear clutch controlling said means, a low speed forward drive means and a reverse drive means between said shafts, said low speed and reverse drive means avoiding said one-way driving device, a shiftable gear element controlling said low speed and said reverse driving means, and mechanism for selectively moving said shiftable gear clutch and gear element into desired drive establishing relation including a single control lever.

20. In transmission mechanism, the combination of aligned driving and driven shafts, a clutch device between said shafts, a lay shaft, meshing gearing on the driving and lay shafts, a loosely mounted gear in alignment with said driving and driven shafts, a gear on said lay shaft in constant mesh with said loosely mounted gear and driven by said meshing gearing, a second clutch means for connecting either said driving shaft or said loosely mounted gear in driving relation with said first clutch, means controlling the operation of said first clutch whereby power may be transmitted between the driving and driven shafts either in both directions or in only one direction, and a single shiftable gear for establishing a driving connection between the lay shaft and the driven shaft avoiding said first clutch.

21. In transmission mechanism, a driven shaft, a drive shaft having a gear fixed thereto, a lay shaft, a drive gear on the lay shaft in constant mesh with the gear on the drive shaft, a plurality of reduction gears on the lay shaft constantly driven by the meshing gears, a loose gear in constant mesh with one of the reduction gears, driving mechanism associated with the driven shaft including an optional one or two-way clutch, a second clutch means for selectively establishing a driving connection from either the driving shaft or the loose gear to the driving mechanism, and means for selectively establishing a two-way forward and reverse driving relationship from any one of the other reduction gears associated with the lay shaft to a portion of the driving mechanism avoiding the first clutch.

22. In transmission mechanism, the combination of a driving shaft, a driven shaft, an intermediate shaft, reduction gearing between the driving and intermediate shafts, reduction gearing between the drive and driven shafts, one gear of said last mentioned gearing being splined on the driven shaft, and a clutch device between the intermediate shaft and the driven shaft.

ALFRED MOORHOUSE.